Feb. 18, 1936.    S. B. SMITH ET AL    2,031,077
WIRELESS DIRECTION FINDING, BEARING FINDING, AND SIMILAR SYSTEM
Filed Feb. 3, 1933
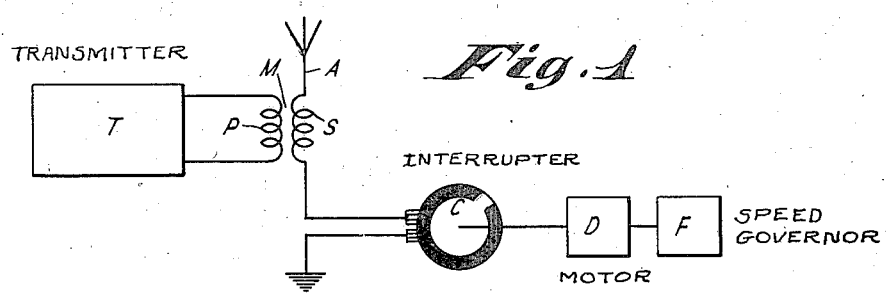
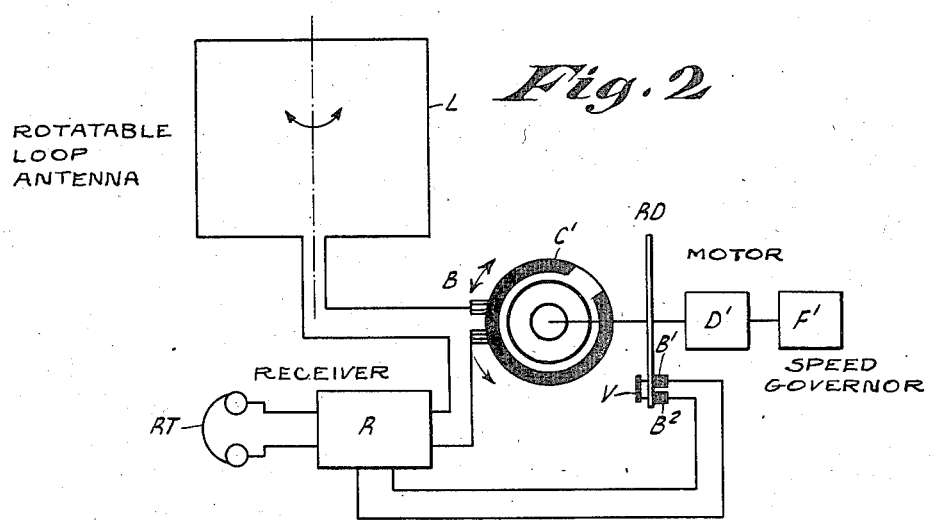
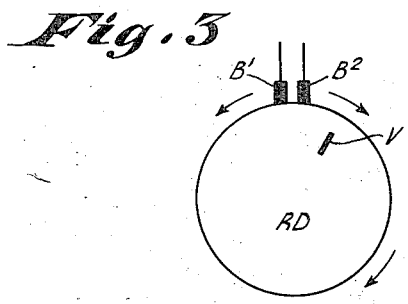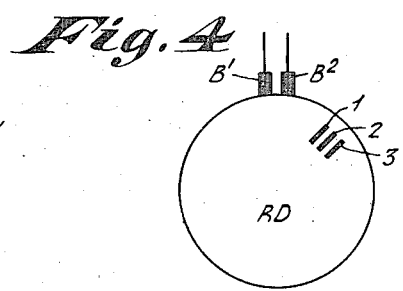
INVENTORS
SIDNEY BERTRAM SMITH &
THOMAS LYDWELL ECKERSLEY
BY
ATTORNEY Patented Feb. 18, 1936

2,031,077

UNITED STATES PATENT OFFICE 2,031,077

WIRELESS DIRECTION FINDING, BEARING FINDING, AND SIMILAR SYSTEM

Sidney Bertram Smith, Chelmsford, and Thomas Lydwell Eckersley, Weatheroak, Danbury, England, assignors to Radio Corporation of America, a corporation of Delaware Application February 3, 1933, Serial No. 655,020
In Great Britain February 25, 1932

5 Claims. (Cl. 250—11)

This invention relates to wireless direction finding, bearing finding and similar systems and has for its object to provide a system whereby an aeroplane or other vehicle carrying a wireless receiving installation may accurately obtain the bearing of a wireless transmitting station emitting signals and situated for example at an aerodrome.

It is an object of our invention to overcome certain of the difficulties heretofore met when attempting to obtain accurate direction finding results. Such difficulties are commonly due to what is known as "night-effect". During the night it is found that signals transmitted from a transmitting station are received at a receiving station more than once, the successive repetitions being spaced apart from one another by a short period of time.

While the present invention is not dependent upon the accuracy or otherwise of the theory now advanced to explain this phenomenon, it is believed that the said phenomenon is due to signals reaching the receiving station via paths of different lengths, one path being direct from the transmitting to the receiving station and another path or plurality of paths being from the transmitting station to the so-called Heaviside layer (an ionized layer believed to exist above the surface of the earth) and thence by reflection one or more times to the receiving station. It is believed that so-called night deviations i. e. those errors of reading which are found in practice to exist in directional wireless receivers when employed during the night time, may be explained on the theory that there occurs a rotation of the plane of polarization when rays are reflected from the so-called Heaviside layer.

While, as above stated, the present invention is not dependent upon the accuracy of this theory it will facilitate a better understanding of the invention if the said invention be regarded as based upon the assumption that as regards those rays which reach the receiver direct from the transmitter no rotation of the plane of polarization occurs, while as regards these rays which reach the receiver by reflection, one or more times from the so-called Heaviside layer, rotation of the plane of polarization does occur. It follows from the theory above outlined that the time taken for a signal to reach the receiver directly from the transmitter will be different from the time taken by the same signal to reach the receiver via the Heaviside layer, and in fact it is an observed phenomenon that there is a short time interval between successive repetitions of the same signal whether or not this time interval be accurately explicable by the said theory. This time interval is found to vary as the distance between transmitter and receiver is changed but for distances of 200 miles or less and in ordinary circumstances it is found in general to be .00015 second or thereabouts. It is further an observed phenomenon that the planes of polarization of the different received rays corresponding to successive repetitions of the same signal are different, the rays resulting in the first repetition being differently polarized from the rays resulting in the second (and subsequent, if any) repetitions. If only the first received signal be utilized for direction finding purposes errors due to night effect are substantially eliminated, and the present invention consists in essence in so arranging the transmitting and receiving apparatus, and in so transmitting and receiving signals, that it is possible at the receiver to differentiate between the first time a particular signal is received and subsequent repetitions, only the first reception of a signal being employed for direction finding purposes.

In carrying out the present invention the transmitter in an installation of the kind in question, is arranged to emit a succession of similar very short pulses each of which occupies a period of time equal to or less than the time interval which is observed to exist between the first reception of a given signal and the first repetition thereof, and the pulses in the said succession of pulses are spaced apart by time periods of sufficient length to permit the receiver to receive all subsequent repetitions due to any one transmitted pulse before the next transmitted pulse is received.

The pulses should thus be each of duration of approximately .00015 second, or less, and may be sent at uniform intervals of .01 second or thereabouts. Means are provided at the receiver for differentiating between the pulses received at intervals of about .00015 of a second, the first of such a closely spaced series of received pulses being utilized for direction purposes and the second and subsequent received pulses being not utilized.

One form of installation of transmitter and co-operating receiver will now be described with reference to the accompanying diagrammatic drawing, in which Figure 1 shows means for transmitting impulses; Figure 2 shows means for receiving the impulses, and Figures 3 and 4 show details of the devices in Figures 1 and 2.

The transmitter comprises transmitting apparatus of normal type and arrangement and represented by the rectangle T (see Figure 1) this apparatus being coupled to a transmitting aerial A by transformer coupling as at M the primary P of the transformer being connected to the transmitting apparatus and the secondary S being connected in series between the aerial and earth. In series with the secondary is an interrupter schematically represented at C and which may be of any known construction and is driven in any convenient way as by an electric motor D whose speed is maintained constant, for example, by means of a tuning fork control system represented at F. The interrupter is such that assuming continuous activation of the transmitting apparatus, the aerial is only connected to earth at intervals of about .01 second and for periods of about .00015 second so that with this arrangement pulses of the latter duration are transmitted at intervals of the former duration. The co-operating receiver which may, for example, be mounted upon an aeroplane is shown schematically in Figure 2 and consists of a normal rotatable direction finding loop aerial or frame L which is coupled to a thermionic amplifier or other receiver proper R through brushes B on an interrupter C' which is driven synchronously with the interrupter at the transmitter. The output of the amplifier or other receiving apparatus proper, is coupled or otherwise fed to a light valve V which is mounted upon a rotating disc RD and is therefore, compelled to rotate with the disc, connection between the output terminals of the receiver proper and the light valve being accomplished by means of adjustable brushes B¹ B². The optical aperture of this rotating light valve is a slit of such dimensions that pulses of .00015 second in duration can be separated. The disc RD is schematically represented in face view in Figure 3. The output from the receiver proper is also taken to a pair of telephones RT or the like so that the received signals can be heard as well as seen. The disc RD is driven synchronously with the interrupter C' and may conveniently be on the shaft of an electric motor D' which drives both the disc and the interrupter, said motor being controlled in speed by a tuning fork control system F' similar to and running synchronously with that at the transmitter. The brushes B¹ B² for conveying the output from the receiver to the light valve are adjustable so that they constitute means for adjusting the phase. Suppose with the arrangement just described the interrupter at the receiver were short circuited, i. e. were so arranged as not to open the receiving aerial circuit. The light valve and disc arrangement would in these circumstances give what may be termed a stationary pattern of the first and subsequent "reflection pulses" i. e. supposing each pulse were to be received with two repetitions each spaced apart by .00015 second, an observer looking at the rotating light valve and disc structure would see three lines of light 1, 2, 3, spaced a short distance apart as shown in Figure 4 the first line being due to the first time each pulse was received, the second line to the first repetition, and the third line to the second repetition thereof. Since the pulses are equal and sent at equal intervals, and since the transmitting and receiving apparatus are synchronous each directly received pulse will give a line in the same position, each first repetition thereof will give a line in a second and different position, and each second repetition thereof will give a line in a third and different position, the lines of light appearing, of course, to be stationary by reason of persistence of vision i. e. as in a stroboscope.

The operation of the apparatus is as follows:—

The transmitting and receiving interrupters are synchronized in any convenient way, for example by transmitting special synchronizing signals or by arranging the driving motors and frequency control systems therefor so exactly alike at the transmitting and receiving stations that special synchronizing signals are not necessary. The receiver interrupter is first disconnected i. e. short circuited so that all the pulses and reflections thereof are received and utilized to build up sharp lines of light which will be observed on the disc and light valve structure. The synchronous interrupter at the receiver is now brought into operation, and the phase position of the brushes for energizing the light valve are so adjusted that only the first of the lines of light i. e. only that line corresponding to the directly received pulses is seen and only the corresponding signals heard in the telephones. The apparatus has therefore now been so adjusted that the receiver is inoperative for repetitions of the transmitted pulses and the direction finding receiving apparatus may be utilized in the well known manner to determine the direction of the transmitting station, for, since repetitions of signals have been "cut out" no errors due to night effect will occur.

The invention can obviously be carried into effect by means other than those above described. For example, the mechanical arrangements above described for obtaining the transmission of the short, equal, uniformly spaced pulses at the transmitter may be replaced by purely electrical means, such, for example, as so-called "squegger" circuits i. e. by circuits of the periodically heavily damped oscillatory type. By this phrase is meant circuits which will transmit short pulses by virtue of their inherent electrical characteristics. Such circuits are well known per se. Similarly at the receiver the mechanical interrupting arrangement may be replaced by a cathode ray tube operated synchronously with the pulse transmitting apparatus at the receiver and utilized to give luminous lines on a screen or other visual markings due to the signals themselves and repetitions thereof.

The values of times given in the above description are given by way of example only, it being found that the actual times separating successive repetitions of the same signal vary somewhat from one set of circumstances to another. The figures actually given, however, are those which are found in practice to exist in ordinary circumstances where the distance between the transmitting station and the receiving station is up to about 200 miles, it being found that at this range the minimum interval of time between the reception of a signal and the first repetition thereof is approximately .00015 second.

It will be apparent that the present invention is only of use where the distance between the transmitting station and the receiver and the power of the transmitter and sensitivity of the receiver are such that direct or surface ray reception is possible during daylight, for obviously if the receiver is so far away from the transmitter that reception is impossible during the daytime, but only possible at night, a system in accordance with the present invention will not be operative since the only signals received at the receiver will be repetition signals.

Having now particularly described and ascertained the nature of our said invention and in what manner the same is to be performed, we declare that what we claim is:—

1. A direction finder system comprising a transmitter for the transmission of interrupted signals, an aerial for said transmitter, a coupling arrangement for said transmitter, comprising an interrupting device driven at a substantially constant pre-determined speed and a rotatable loop aerial coupled to a receiver having associated therewith an interrupting device comprising a rotatable disk to interrupt the signals from said transmitter and being driven at substantially the same speed as said transmitter, said interrupting device having means provided by said rotatable disk to differentiate between a desired signal from said transmitter and a subsequent repetition, the said desired signal being used for determining the point of origin of said signal.

2. A direction finder system having in combination a transmitter for the transmission of interrupted pulses, an aerial for said transmitter, a coupling arrangement for said transmitter, a rotatable loop aerial coupled to a receiver capable of receiving said interrupted pulses and a subsequent repetition of said interrupted pulses from said transmitter, said receiver having means to differentiate between the first mentioned interrupted pulses and the subsequent repetition of said interrupted pulses, said means comprising a rotatable loop aerial, and an interrupter coupled to said rotatable loop aerial and driven by a motor at a speed substantially the same as a corresponding interrupter on said transmitter.

3. A direction finder system having in combination a transmitter for the transmission of interrupted pulses, an aerial for said transmitter, a coupling arrangement for said transmitter, a rotatable loop aerial coupled to a receiver capable of receiving said interrupted pulses and a subsequent repetition of said interrupted pulses from said transmitter, said receiver having means to differentiate between the first mentioned interrupted impulses and the subsequent repetition of said interrupted pulses, said means comprising a rotatable loop aerial, an interrupter coupled to said rotatable loop aerial and driven by a motor at a speed substantially the same as a corresponding interrupter on said transmitter, and a light valve having connections to said receiver output and mounted on a rotatable disc to distinguish the interrupted pulses from the subsequent repetition thereof, said disc being driven by the same shaft as said interrupter.

4. A direction finder system having in combination a transmitter for the transmission of interrupted pulses, an aerial for said transmitter, a coupling arrangement for said transmitter, a rotatable loop aerial coupled to a receiver capable of receiving said interrupted pulses and a subsequent repetition of said interrupted pulses from said transmitter, said receiver having means to differentiate between the first mentioned interrupted pulses and the subsequent repetition of said interrupted pulses, said means comprising a rotatable loop aerial, an interrupter connected to said rotatable loop aerial and driven by a motor at a speed substantially the same as a corresponding interrupter on said transmitter, a light valve mounted on a rotatable disc to distinguish the interrupted pulses from the subsequent repetition thereof, said disc being driven by the same shaft as said interrupter, and a plurality of brushes arranged in adjustable relation to said rotatable disc and connected to the output of the receiver which energizes said light valve so as to produce a substantial stroboscopic pattern to distinguish from the received signal and the subsequent repetition thereof.

5. In a direction finding system, a transmitter comprising means for emitting a substantially uniformly periodic succession of wave energy pulses, each pulse being of shorter duration than one of the time intervals elapsing between successive pulses, and the repetition rate of emission of said pulses being slower than the delay interval observable at a remote point of reception of said pulse when received after reflection, in relation to the moment of reception of the ground wave thereof, said transmitter being in combination with a receiver comprising a rotatable energy collecting device, a receiving network, means for intermittently interconnecting said collecting device and said receiving network, and means under control of signals transferred to said receiving network for distinguishably indicating the respective effects of ground-wave reception and reflected wave reception of said pulses.

SIDNEY BERTRAM SMITH.
THOMAS LYDWELL ECKERSLEY.